Mar. 27, 1923.

F. W. PEEK, JR 1,449,694

PROTECTIVE DEVICE

Filed Sept. 18, 1919

Inventor:
Frank W. Peek, Jr.
by Albert G. Davis
His Attorney.

Patented Mar. 27, 1923.

1,449,694

UNITED STATES PATENT OFFICE.

FRANK W. PEEK, JR., OF PITTSFIELD, MASSACHUSETTS, ASSIGNOR TO GENERAL ELECTRIC COMPANY, A CORPORATION OF NEW YORK.

PROTECTIVE DEVICE.

Application filed September 18, 1919. Serial No. 324,614.

*To all whom it may concern:*

Be it known that I, FRANK W. PEEK, Jr., a citizen of the United States, residing at Pittsfield, in the county of Berkshire, State of Massachusetts, have invented certain new and useful Improvements in Protective Devices, of which the following is a specification.

My invention relates to protective devices and particularly to devices for protecting and insulating a transmission line and has for its object to provide a protective supporting means for a line wire across which an arc discharge is to be prevented.

On transmission line wires carried on towers or poles it is customary to support the line wires and insulate them from ground upon some form of insulator supporting means. In such devices of the ordinary type, a surge of steep wave front passing along the line will build up enough voltage across the insulating support to cause an arc-over of the same accompanied usually by a destruction of the insulator support and resulting often in a grounding of the line.

According to my invention, I provide a supporting means for a line wire which is differentially operative under various conditions, such as on surges of steep wave front to greatly increase the arc-over or puncture voltage necessary to arc over the support. This supporting means comprises in general a device possessing capacitance such as an insulator between the line and ground and a means in series therewith acting to permit the voltage under normal conditions due to capacitance to be impressed across the insulator but differentially operative to prevent the building up of voltage across the insulator upon the occurrence of surges of steep wave front. This means consists of a high resistance device so related to the insulator that a differential or selective action is obtained. Under normal conditions the voltage across the supporting means is substantially all across the capacitance device, while under surges of steep wave front, the voltage is substantially all impressed across the resistance device.

Figure 1:
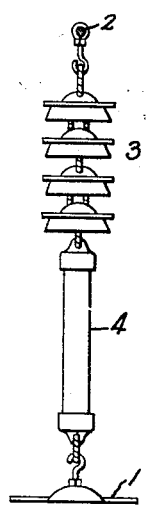
Figure 3:
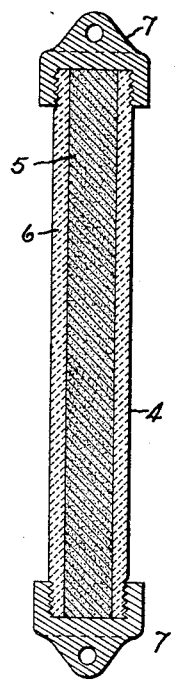
Figure 2:
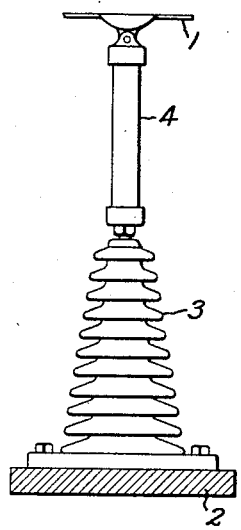

The novel features which I believe to be characteristic of my invention will be definitely indicated in the claims appended hereto, while the features of construction and mode of operation will be understood by reference to the following description taken in connection with the accompanying drawing which shows the preferred embodiments of my invention in which:

Fig. 1 shows a supporting means embodying my invention; Fig. 2 shows a modified form of supporting means, and Fig. 3 is a detailed view of the resistance device.

In Fig. 1 I have shown a supporting or protecting means embodying my invention and supporting a line wire 1 of a transmission line. The supporting means serves to insulate the line wire 1 from ground and is connected, for instance, between the line and a tower or other suitable support 2. This supporting means comprises a capacitance device such as an insulator 3 and which may be of the pin, bushing or suspension type connected between line and ground and a high resistance device 4 which in the preferred form comprises a rod 5 of carbon or like material connected in series therewith, preferably between the line 1 and the insulator 3 or on the line side of the insulator. The rod 5 is of low capacitance compared with that of insulator 3 and as shown in Fig. 3, is preferably inclosed in an insulating casing 6 of porcelain or like material, screw-threaded at each end or otherwise adapted to be held in engagement with a suitable cap or connecting member 7. The high resistance device 4 is preferably of the highest resistance that will carry without appreciable drop the charging current of the insulator 3 at the normal line frequency and voltage.

The relation of the resistance of the rod 5 and the capacitance afforded by insulator 3 is such that under normal operating or 60 cycle voltages, the rod 5 offers very little resistance and practically all the voltage across the supporting means is impressed across the insulator 3 due to capacity current. Upon the occurrence, however, of a surge of steep wave front passing along line wire 1, the insulator is protected from arc-over due to the fact that the voltage across the supporting means due to the surge is practically all impressed across the resistance device 4. This action is thus differential or selective, the potential difference being impressed across either the capacitance or resistance device to afford effective protection without an arc-over whereby dangerous voltages are prevented from building up across the insulator 3. The resistance device 4 serves to effect the function of suddenly increasing the insulating characteristics of the supporting means at this point and functions upon the occurrence of steep wave front surges to greatly increase the time required for the voltage to build up across the insulator to a value necessary to cause an arc-over. The surge, therefore, does not have time to build up to a voltage sufficient to arc over the insulator 3 but passes on along the line wire 1 to the lightning arresters or other protective devices arranged to dissipate the surge.

Should, under some unusual and excessive conditions, a voltage be impressed across the insulator 3 sufficient to produce an arc-over then the high resistance device 4 which is in series with the arc serves to limit the current to a small value which is insufficient to cause damage to the insulator and at the same time acts to prevent oscillations from being set up upon the line.

While in Fig. 1 I have shown my invention embodied in a supporting means of the suspension type, the invention is equally applicable, as shown in Fig. 2, to a supporting means of the pin, or bushing type.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination with a line wire, a supporting means therefor comprising a device possessing capacitance, and a resistance device in series therewith between said capacitance device and said line wire having the highest resistance that will permit transmission of the charging current of said capacitance device at normal voltage and frequency without appreciable drop whereby normal voltages are substantially all impressed across said capacitance device while surge voltages are substantially all impressed across said resistance device.

2. In a device of the character described, the combination with an insulating supporting means, and a non-inductive resistance forming a part of said supporting means in series therewith and of such a value as to prevent the building up of high voltages across said insulating means on surges of steep wave front.

3. The combination with a line wire, of a wire support comprising an insulator, and a resistance in series with the insulator great enough to prevent upon the occurrence of surges on said line wire, the building up of a voltage across said insulator sufficient to arc over and small enough to carry the charging current of said insulator at normal line voltage and frequency without appreciable drop.

4. A support for line wires comprising an insulator and a resistance rod of less capacitance than said insulator mechanically secured thereto and electrically connected in series therewith and having the highest resistance which will permit said rod to carry the charging current of said insulator at normal frequency and voltage without appreciable drop.

In witness whereof, I have hereunto set my hand this 15th day of Sept., 1919.

FRANK W. PEEK, Jr.